US008175841B2

(12) United States Patent
Ooghe

(10) Patent No.: US 8,175,841 B2
(45) Date of Patent: May 8, 2012

(54) COLOUR FEEDBACK WITH SINGLE OPTICAL SENSOR

(75) Inventor: Jurgen Ooghe, Gavere (BE)

(73) Assignee: Barco N.V., Kortrijk (BE)

( * ) Notice: Subject to any disclaimer, the term of this patent is extended or adjusted under 35 U.S.C. 154(b) by 1275 days.

(21) Appl. No.: 11/898,094

(22) Filed: Sep. 10, 2007

(65) Prior Publication Data

US 2008/0065345 A1 Mar. 13, 2008

Related U.S. Application Data

(60) Provisional application No. 60/843,409, filed on Sep. 11, 2006.

(51) Int. Cl.
*G06F 15/00* (2006.01)

(52) U.S. Cl. .................................................... 702/159

(58) Field of Classification Search .................. 702/159, 702/189; 362/231, 253; 353/94
See application file for complete search history.

(56) References Cited

U.S. PATENT DOCUMENTS

2004/0113044 A1 6/2004 Ishiguchi
2005/0117190 A1 6/2005 Iwauchi et al.
2005/0117367 A1 6/2005 Chikugawa
2006/0002109 A1 * 1/2006 Imade .......................... 362/231

FOREIGN PATENT DOCUMENTS

WO WO 2006/014473 A1 2/2006

OTHER PUBLICATIONS

European Search Report regarding EP 07017725.8-2206/1898677, Aug. 10, 2011.

* cited by examiner

*Primary Examiner* — Bryan Bui
(74) *Attorney, Agent, or Firm* — Bacon & Thomas, PLLC

(57) ABSTRACT

A method for controlling an illumination system comprises determining first drive settings for each of a plurality of colored light sources, the first drive settings generating an ON and an OFF time of the light sources; for each of the light sources of a first color and the light sources of a second color changing the first drive settings so that the ON time of the light sources of a selected one of the first and second color does not coincide with the ON time of the light sources of the other colors for at least a period of time, and during that period, measuring the peak luminance of the light sources; and for each of the light sources of the first and second color recalculating the drive settings, based on the measured peak luminance for the light sources of that color, so as to maintain a pre-determined color point.

13 Claims, 6 Drawing Sheets

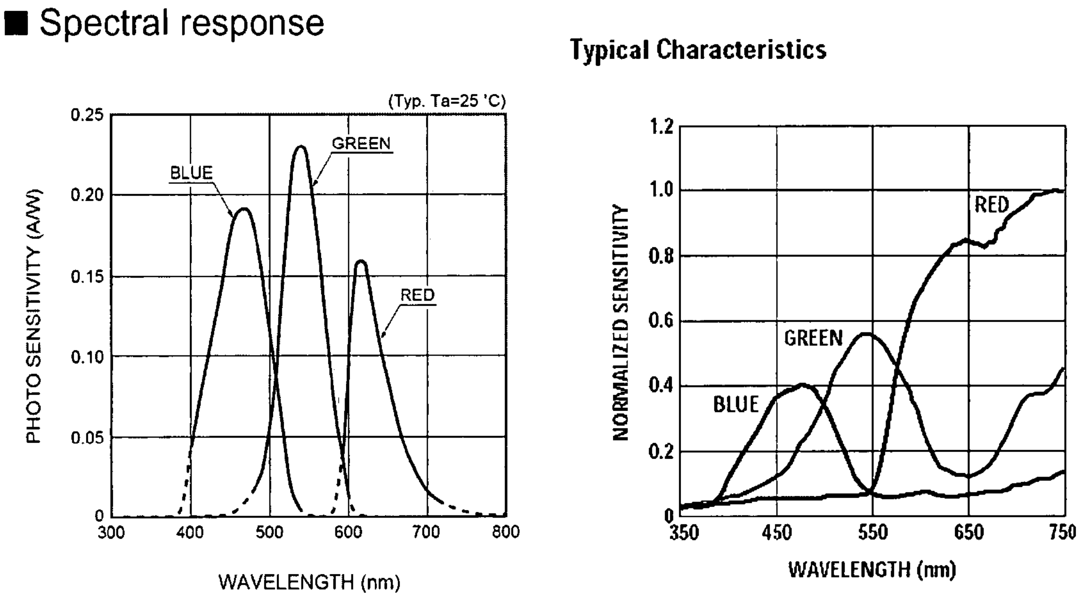
Fig. 1 – Prior art
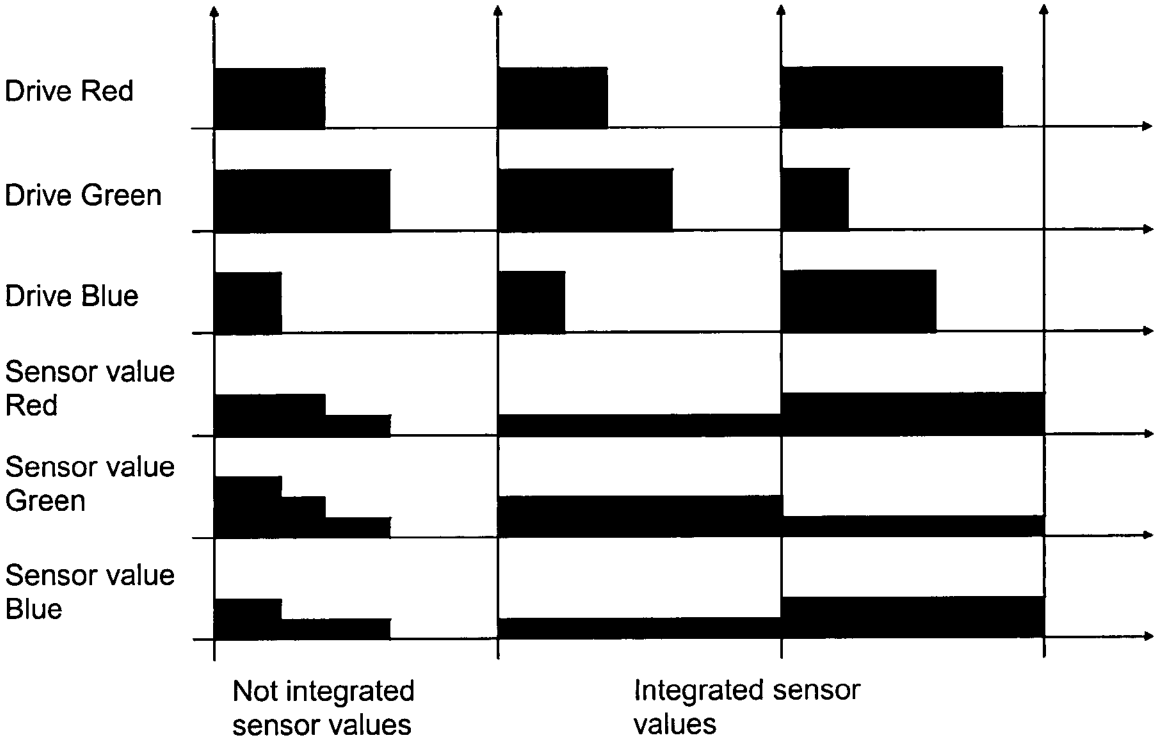
Fig. 2 – Prior art $$A^{-1} = \begin{pmatrix} \frac{((-1+x_G)y_B-(-1+x_B)y_G)y_R}{x_R(-y_B+y_G)+x_G(y_B-y_R)+x_B(-y_G+y_R)} & \frac{(-x_G(-1+y_B)+x_B(-1+y_G))y_R}{x_R(y_B-y_G)+x_B(y_G-y_R)+x_G(-y_B+y_R)} & \frac{(x_G y_B-x_B y_G)y_R}{x_R(-y_B+y_G)+x_G(y_B-y_R)+x_B(-y_G+y_R)} \\ -\frac{y_G((-1+x_R)y_B-(-1+x_B)y_R)}{x_R(-y_B+y_G)+x_G(y_B-y_R)+x_B(-y_G+y_R)} & \frac{y_G(-x_R(-1+y_B)+x_B(-1+y_R))}{x_R(-y_B+y_G)+x_G(y_B-y_R)+x_B(-y_G+y_R)} & -\frac{y_G(x_R y_B-x_B y_R)}{x_R(-y_B+y_G)+x_G(y_B-y_R)+x_B(-y_G+y_R)} \\ -\frac{y_B((-1+x_R)y_G-(-1+x_G)y_R)}{x_R(y_B-y_G)+x_B(y_G-y_R)+x_G(-y_B+y_R)} & \frac{y_B(-x_R(-1+y_G)+x_G(-1+y_R))}{x_R(y_B-y_G)+x_B(y_G-y_R)+x_G(-y_B+y_R)} & -\frac{y_B(x_R y_G-x_G y_R)}{x_R(y_B-y_G)+x_B(y_G-y_R)+x_G(-y_B+y_R)} \end{pmatrix}$$

Fig. 7

COLOUR FEEDBACK WITH SINGLE OPTICAL SENSOR

This application claims the benefit of provisional application No. 60/843,409 filed Sep. 11, 2006, the entirety of which is incorporated herein by reference.

TECHNICAL FIELD OF THE INVENTION

The present invention relates to an optical feedback control system and a method for controlling brightness and/or colour of a light source, for example a backlight for a display system, as well as to a controller and software therefor.

BACKGROUND OF THE INVENTION

The present invention is directed in at least some of its embodiments to a display with a light source, for example a solid state light source, such as e.g. a light-emitting diode (LED), as a backlight. Robustness, reliability and long life of LEDs are known to be advantageous. However, currently, the intensity output of some light sources, in particular of solid state light sources, such as LEDs, varies according to factors such as temperature and age. Consequently, conventional LED based backlights and others do not maintain desired intensity and/or colour during their lifetime. The present invention seeks to solve this problem.

In a typical multi-colour based backlight, e.g. RGB backlight, a plurality of optical sensors, e.g. 3 in the case of RGB backlight, are based in the backlight cavity. Each optical sensor is read out by a control device that compensates the drive settings to the correct or desired white point, based on the read out luminance values. Typically, the three optical sensors are placed in one package and have a spectral response as shown in FIG. 1. Because the colour filters of the optical sensors are overlapping, there is an influence of the other colours during readout of one colour. For example, if one reads out GREEN, also a part of RED and BLUE is in the end result, as shown in FIG. 1, in particular in the left hand side showing the non-integrated sensor values. It can be seen that, when RED is switched off while GREEN is still on, the red sensor will still sense some light, i.e. that part of the GREEN which is in the wavelength range detectable by the red sensor. In typical systems, the LEDs are driven by PWM, as shown in the top halve of FIG. 2, and sensor values are integrated to DC for measurements, as illustrated in the middle and right hand side of FIG. 2. This results in very slow response times and if high dimming ratio is required also in high resolution and expensive A/D converters being required. To avoid the effect of interference of other colours in the optical sensors, colour sequencing can be used, but this may result in colour break-up and lower dimming ratios.

An LED-based luminaire is known from WO 2006/014473, which includes an emitter module having one or more LEDs and a regulating device that regulates the current delivered to the emitter module. The luminaire may include an optical sensor that measures the LED radiant output, and a controller that uses the detected output to control the regulating device based on the measured output, in order to maintain a consistent colour and/or intensity level. The LED-based luminaire may incorporate one or more colour channels, and the optical sensor may produce an intensity output for each colour corresponding to the colour channels. The sensor may be a single integrated circuit device which is capable of detecting multiple colour channels. If such sensor has to sense the luminance of the different colour channels, typically each colour will be driven separately sequentially. A disadvantage of this method is that colour break-up will occur, and that therefore the refresh rate of a display with such LED-based luminaire as backlight needs to be very high, e.g. 600 to 700 Hz.

SUMMARY OF THE INVENTION

It is an object of the present invention to provide good apparatus or methods for controlling brightness and/or colour of an illumination system comprising a plurality of coloured light sources, e.g. an illumination system for use in a backlit display, in particular for controlling brightness and/or colour of a backlight of a display.

The above objective is accomplished by a method and device according to the present invention.

In a first aspect, the present invention provides a method for controlling an illumination system comprising a plurality of coloured light sources, there being at least one or more light sources of a first colour and one or more light sources of a second colour, the first colour being different from the second colour, the illumination system being for emitting illumination light. The method comprises determining first drive settings for each of the plurality of coloured light sources so as to provide illumination light with a pre-determined colour point and/or a pre-determined luminance, the first drive settings generating an ON time and an OFF time of the light sources; for each of the light sources of the first colour and the light sources of the second colour performing a measuring step, the measuring step comprising changing the first drive settings so that the ON time of the light sources of a selected one of the first and second colour does not coincide with the ON time of the light sources of the other colours for at least a period of time, and during that period of time, measuring the peak luminance of the light sources of the selected one of the first and second colour; and for each of the light sources of the first colour and the second colour performing a calculation step, comprising based on the measured peak luminance for the light sources of that colour, and recalculating the drive settings into second drive settings so as to maintain a pre-determined colour point.

This means that drive settings and fractions may be recalculated after sample and hold of every single colour or, alternatively, drive settings and fractions may be recalculated only after a sample and hold action of all the colours has been performed.

In one embodiment of this first aspect, the present invention provides a method for controlling an illumination system comprising a plurality of coloured light sources, there being at least one or more light sources of a first colour and one or more light sources of a second colour, the first colour being different from the second colour, the illumination system being for emitting illumination light. The method comprises determining first drive settings for each of the plurality of coloured light sources so as to provide illumination light with a pre-determined colour point and/or a pre-determined luminance or intensity level, the first drive settings generating an ON time and an OFF time of the light sources, for the light sources of the first colour, changing the first drive settings so that the ON time of the light sources of the first colour does not coincide with the ON time of the light sources of the other colours for at least a first period of time, during the first period of time, measuring the peak luminance of the light sources of the first colour, based on the measured peak luminance for the light sources of the first colour, recalculating the drive settings into second drive settings so as to maintain pre-determined colour point, and repeating the above steps for at least the light sources of the second colour.

In the above sequence, drive settings and fractions are recalculated after sample and hold of every single colour. However, according to alternative embodiments of the present invention, drive settings and fractions could be recalculated only after a sample and hold action of all the colours has been performed.

The first drive settings may comprise current control and pulse width modulation control.

According to embodiments of the present invention, the method may furthermore comprise directly or indirectly measuring temperature of the coloured light sources.

In a second aspect, the present invention provides a system for controlling an illumination system comprising a plurality of coloured light sources, there being at least one or more light sources of a first colour and one or more light sources of a second colour, the first colour being different from the second colour, the illumination system being for emitting illumination light. The system in accordance with the present invention comprises driving means for driving each of the plurality of coloured light sources so as to provide illumination light with a pre-determined colour point and/or a pre-determined luminance or intensity level, the driving means generating an ON time and an OFF time of the light sources based on first drive settings, a controller adapted for changing, for the light sources of the first colour, the first drive settings so that the ON time of the light sources of the first colour does not coincide with the ON time of the light sources of the other colours for at least a period of time, and measuring means for measuring, during that period of time, the peak luminance of the light sources of the first colour, the controller being adapted for recalculating, based on the measured peak luminance for the light sources of the first colour, the first drive settings into second drive settings so as to maintain pre-determined colour point.

The plurality of coloured light sources may be solid state light sources, such as e.g. light emitting diodes.

The plurality of coloured light sources may be red, green and blue light sources.

The system for controlling may be part of a display system, such as for example, the invention however not being limited thereto, avionics display systems, displays in automobiles, ships or trains, monitors, industrial monitors, medical monitors, electronic equipment such as global positioning systems (GPS) displays or stereo equipment, handheld computers such as personal digital assistants (PDAs), LCD TV applications or wireless handsets (digital cellular phones).

In a further aspect the present invention provides a controller for controlling an illumination system comprising a plurality of coloured light sources, there being at least one or more light sources of a first colour and one or more light sources of a second colour, the first colour being different from the second colour, the illumination system being for emitting illumination light, and driving means for driving each of the plurality of coloured light sources so as to provide illumination light with a pre-determined colour point and/or a pre-determined luminance, the driving means generating an ON time and an OFF time of the light sources based on first drive settings, the controller comprising: means for changing, for the light sources of the first colour, the first drive settings so that the ON time of the light sources of the first colour does not coincide with the ON time of the light sources of the other colours for at least a period of time, measuring means for measuring, during that period of time, the peak luminance of the light sources of the first colour, and the controller being adapted for recalculating, based on the measured peak luminance for the light sources of the first colour, the first drive settings into second drive settings so as to maintain pre-determined colour point.

The controller may be part of a display system, such as for example, the invention however not being limited thereto, avionics display systems, displays in automobiles, ships or trains, monitors, industrial monitors, medical monitors, electronic equipment such as global positioning systems (GPS) displays or stereo equipment, handheld computers such as personal digital assistants (PDAs), LCD TV applications or wireless handsets (digital cellular phones). In further aspects of the present invention a computer program product is provided for executing any of the methods of the present invention as well as a machine readable storage medium storing the computer program product.

In yet a further aspect, the present invention provides a display having a illumination system comprising a plurality of coloured light sources, there being at least one or more light sources of a first colour and one or more light sources of a second colour, the first colour being different from the second colour, the illumination system being for emitting illumination light; and a system for controlling the illumination system. The system for controlling the illumination system is as described with respect to a previous aspect of the present invention.

It is an advantage of embodiments of the present invention that cheaper optical sensors may be used, in view of the fact that a single sensor may be used that covers the complete spectral range of interest, e.g. the complete visible spectral range, rather than a plurality of individual colour sensors, e.g. individual R, G and B sensors.

It is a further advantage of embodiments of the present invention that no recalibration is required for lifetime compensation.

It is yet another advantage of embodiments of the present invention that they allow colour control, e.g. white point control, over a high dimming range.

The present invention may be particularly useful in avionics displays.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1 is an illustration of spectral response and sensitivity of prior art red, green and blue optical sensors.

FIG. 2 illustrates interference of other colours in optical sensors when using typical PWM driving of solid state light sources.

FIG. 7 shows the explicit form of an inverse matrix used during the calculation of an example embodiment.

In the drawings, the same reference numbers are used to indicate similar or analogous items or method steps.

DESCRIPTION OF ILLUSTRATIVE EMBODIMENTS

Figure 3:
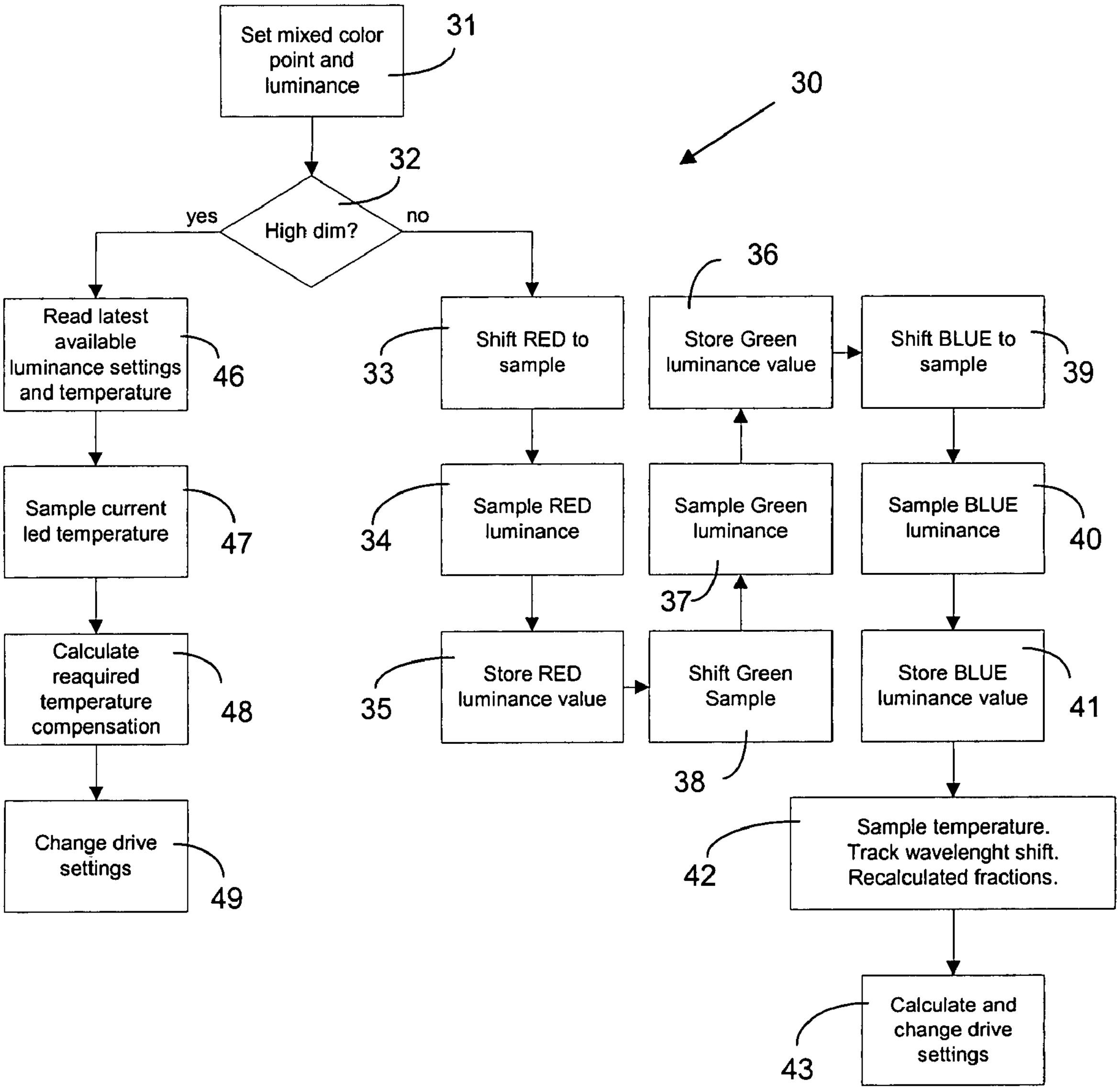
FIG. 3 is a block diagram of a feedback process in accordance with embodiments of the present invention.

The present invention will be described with respect to particular embodiments and with reference to certain drawings but the invention is not limited thereto but only by the claims. The drawings described are only schematic and are non-limiting. In the drawings, the size of some of the elements or the timing in graphs may be exaggerated and not drawn on scale for illustrative purposes. The dimensions and the relative dimensions do not correspond to actual reductions to practice of the invention.

Furthermore, the terms first, second, third and the like in the description and in the claims and in the description, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

The present invention may be particularly useful in high dimming range LCD displays with RGB LED backlights, such as avionics displays. Avionics displays provide critical flight information to aircraft pilots. Such displays should be readable under a variety of lighting conditions: on the one hand they must be readable in full daylight conditions, and on the other hand they must be readable in complete darkness. An appropriate amount of backlight illumination is required to ensure consistent, readable avionics displays under a variety of changing lighting conditions.

Providing an appropriate amount of backlight requires a broad range of illumination. In dark ambient light conditions, low levels of backlight may be appropriate, such as 1 fL (footlambert), whereas in bright ambient light conditions, larger levels of light generation, such as 200 mL, are appropriate. Once the appropriate light level is determined, various factors may impact the amount of light actually generated.

One of such factors is temperature. A temperature change can be induced by changing ambient temperature, e.g. in the cockpit, and/or by changing temperature of the electrical components, due to the use thereof (power dissipation). Another such factor is ageing. It is known that the luminance output of light sources, in particular of solid state light sources such as LEDs, is highly dependent on the ageing of the light sources. The light produced by a backlight, e.g. based on solid state light sources such as for example LEDs, may gradually change over time. Furthermore, light sources, and in particular solid state light sources may undergo a colour shift over time.

Although the present invention is particularly useful for avionics display systems, it is not limited thereto. It can also be used for controlling backlight for displays in automobiles, ships or trains. Other fields of application may be for example desktop monitors, industrial monitors, medical monitors, electronic equipment such as global positioning systems (GPS) displays or stereo equipment, handheld computers such as personal digital assistants (PDAs), LCD TV applications and wireless handsets (digital cellular phones) etc.

The present invention is directed to a method and a system for controlling the brightness and/or colour output of an illumination system comprising a plurality of coloured light sources, in particular for controlling the brightness and/or colour output of a backlight system comprising light sources of at least two colours.

Figure 6:
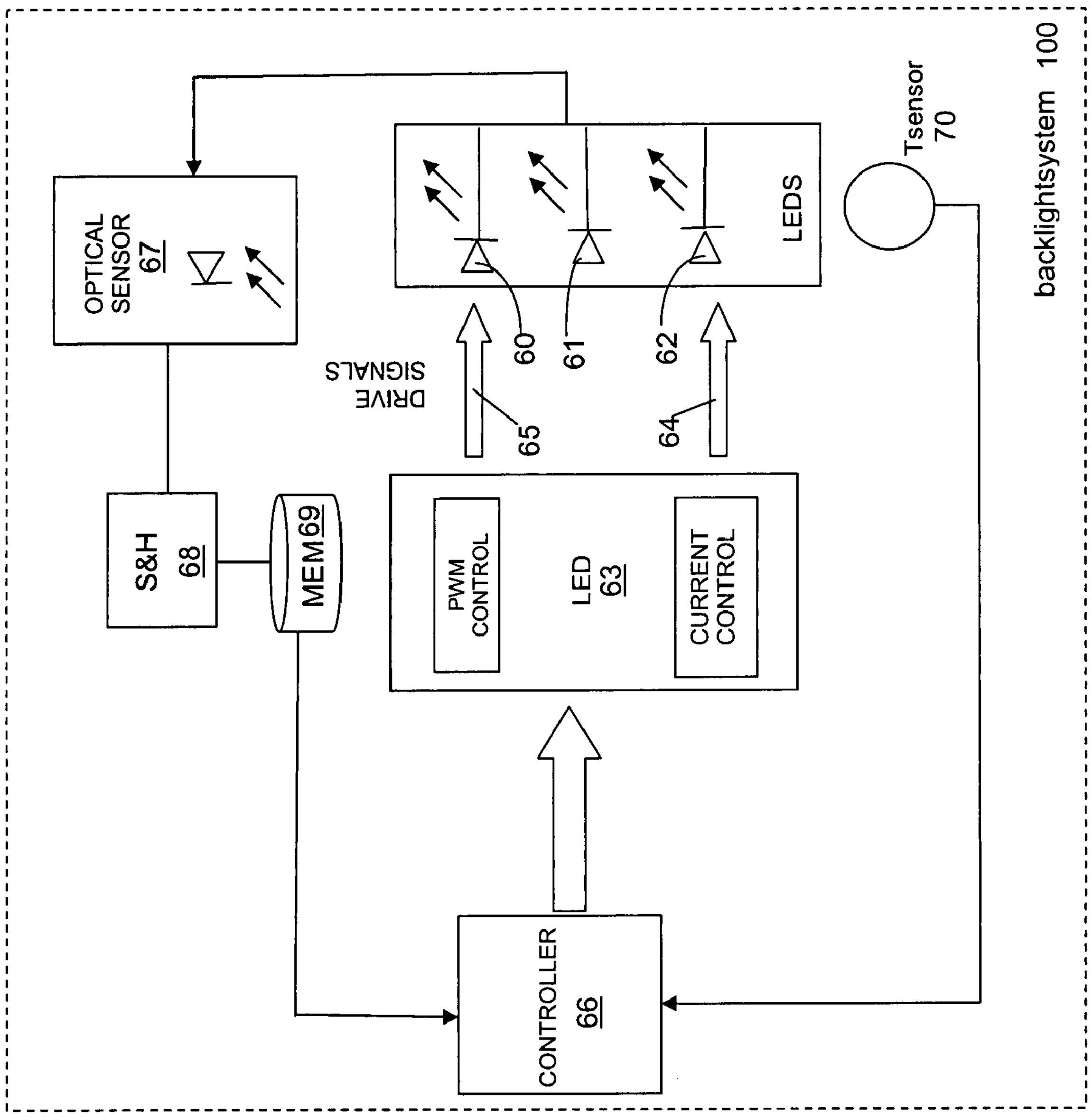
FIG. 6 illustrates functional components of a backlight system in accordance with an embodiment of the present invention.

According to an exemplary embodiment, and as illustrated in FIG. 6, the backlight system 100 comprises a plurality of light sources, e.g. coloured light-emitting diodes (LEDs), of different colours, such as LEDs 60, 61, 62 of three colours, e.g. red, green and blue (RGB) LEDs. The plurality of LEDs 60, 61, 62 may be combined into a plurality of colour channels, e.g. in the example given above a red, a green and a blue colour channel. The LEDs 60, 61, 62 may be arranged in a planar matrix functioning as a backlight for an instrument display, such as an LCD display (not illustrated). The LCD is translucent and some of the light generated by the LED matrix behind the LCD display passes through the display, illuminating the display. Such display arrangements may be used in avionics or vehicular applications, but also in desktop applications, requiring varying backlight levels The LEDs 60, 61, 62 are controlled by a LED driver 63 generating control signals such as e.g. a drive current control signal 64 and a pulse width modulation (PWM) control signal 65. The drive current control signal 64 controls the current flowing through the LEDs. The PWM control signal 65 controls the power to the LEDs. The combination of the drive current control signal 64 and the PWM control signal 65 to an LED 60, 61, 62 determines the ON time and the emitted luminance of the LEDs 60, 61, 62.

The LED driver 63 itself is preferably controlled by a controller 66. The controller 66 may include a digital processing or computing device, e.g. a microprocessor, for instance it may be a micro-controller. In particular, it may include a programmable LED driver controller, for instance a programmable logic device such as a Programmable Array Logic (PAL), a Programmable Logic Array (PLA), a Programmable Gate Array (PGA), especially a Field Programmable Gate Array (FPGA). The controller 66 may be programmed by suitable software that carries out any of the methods of the present invention. In particular the software may include code that executes a method for controlling an illumination system comprising a plurality of coloured light sources, there being at least one or more light sources of a first colour and one or more light sources of a second colour, the first colour being different from the second colour, the illumination system being for emitting illumination light when executed on a suitable processing device. The software may include for determining first drive settings for each of the plurality of coloured light sources so as to provide illumination light with a pre-determined colour point and/or a pre-determined luminance, the first drive settings generating an ON time and an OFF time of the light sources; for the light sources of the first colour, changing the first drive settings so that the ON time of the light sources of the first colour does not coincide with the ON time of the light sources of the other colours for at least a period of time; during that period of time, measuring the peak luminance of the light sources of the first colour; based on the measured peak luminance for the light sources of the first colour, recalculating the drive settings into second drive settings so as to maintain a pre-determined colour point; and repeating the above steps for at least the light sources of the second colour. Alternatively, the software may include code that executes a method for controlling an illumination system comprising a plurality of coloured light sources as indicated above, but whereby the sequence is different in that, in that method, in first instance first drive settings for each of the plurality of coloured light sources are determined so as to provide illumination light with a pre-determined colour point and/or a pre-determined luminance. Thereafter, the first drive settings for the light sources of one of the colours are changed, so that the ON time of the light sources of that colour does not coincide with the ON time of the light sources of the other colours for at least a period of time, and the peak luminance of the light sources of that colour is measured during that period of time. This changing of the first drive settings of the light sources of a colour and measuring of the peak luminance of the light sources of that colour is performed in sequence for at least the light sources of a first colour and the light sources of a second colour. Thereafter, the drive settings are recalculated into second drive settings so as to maintain a pre-determined colour point.

The software may also include code whereby the first drive settings comprise current control and pulse width modulation control. The software may also include code for directly or indirectly measuring temperature of the coloured light sources.

The controller 66 may store calibration values of all colours such as luminance at full duty, temperature, colour, mixed colour set point.

In accordance with embodiments of the present invention, the backlight system 100 is provided with a single optical sensor 67, i.e. a single sensor which is adapted to sense the light output from each of the light source channels, thus generating an optical sensor value for each of the colour channels of the backlight system 100. The optical sensor 67 may be a photodiode. The optical sensor may 67 be any sensor that covers a spectral range of interest, depending on the light sources 60, 61, 62 in the illumination system, e.g. a sensor that covers the visible spectral range. The optical sensor 67 may e.g. have a spectral range from 400 to 700 nm. The optical sensor 67 may be placed in the backlight cavity. Using such single sensor 67 rather than using a plurality of dedicated colour sensors alleviates the use of expensive optical filters to be used for the sensor, and thus reduces the cost of the system. Using a single circuit furthermore prevents differential ageing.

The optical sensor 67 may be coupled to a sample and hold circuit 68 which may sample the measurement value of the optical sensor 67 and optionally store it in a memory 69 where it may be fetched by the controller 66. This storing of a measurement value in the memory 69 may in particular be used when the light sources of the different colours are first sampled in sequence, the recalculation of the drive settings into second drive settings being performed only after the measurement values in the plurality of colour channels have been generated.

Optionally, the backlight system 100 in accordance with embodiments of the present invention may also be provided with a temperature sensor 70, for sensing the temperature of the light sources, e.g. LEDs 60, 61, 62.

The controller 66 reads out from the sensors 67, 70 the optical sensor value and optionally ambient conditions such as LED temperature. Based on these measurements, and by comparing the sensed luminance with the pre-determined or desired luminance, correction values for the drive signals 64, 65 to the LEDs 60, 61, 62 are determined. This is done during real-time, i.e. measurements are made and corrections to the drive signals 64, 65 are applied while the light source is in use for a real application. With "in use for a real application" is meant, e.g. for a backlit display, while data content is being displayed to a user, rather than during calibration or during setting-up of the display system. The corrections are so as to obtain a controlled colour point and/or luminance of the light source, e.g. backlight.

Ambient light may furthermore also be measured by means of an ambient light sensor (not illustrated in FIG. 6), in order to determine the amount of dimming required, or thus the desired luminance.

Figure 4:
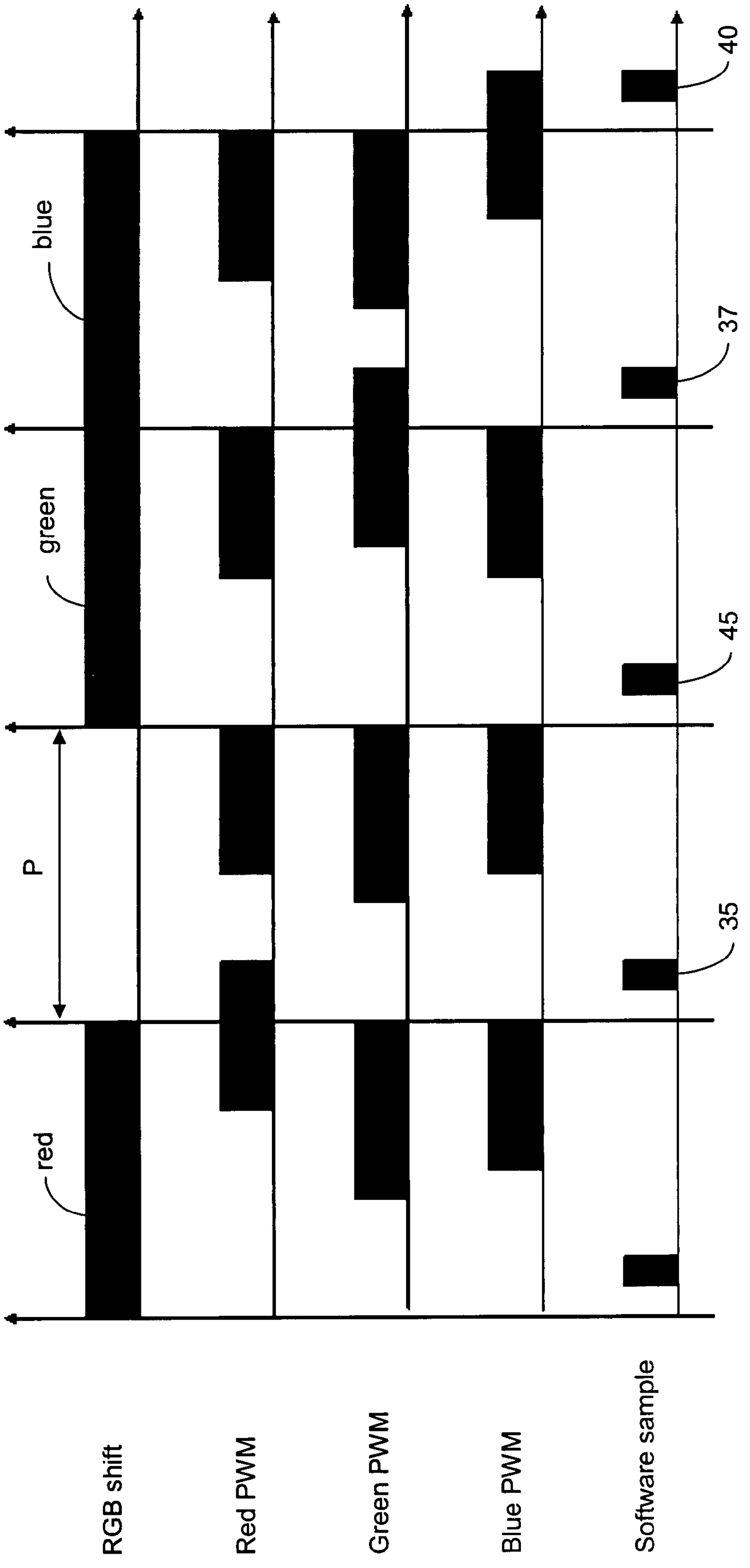
FIG. 4 illustrates how colours are shifted from each other in time and when a colour is sampled, in accordance with embodiments of the present invention.
Figure 5:
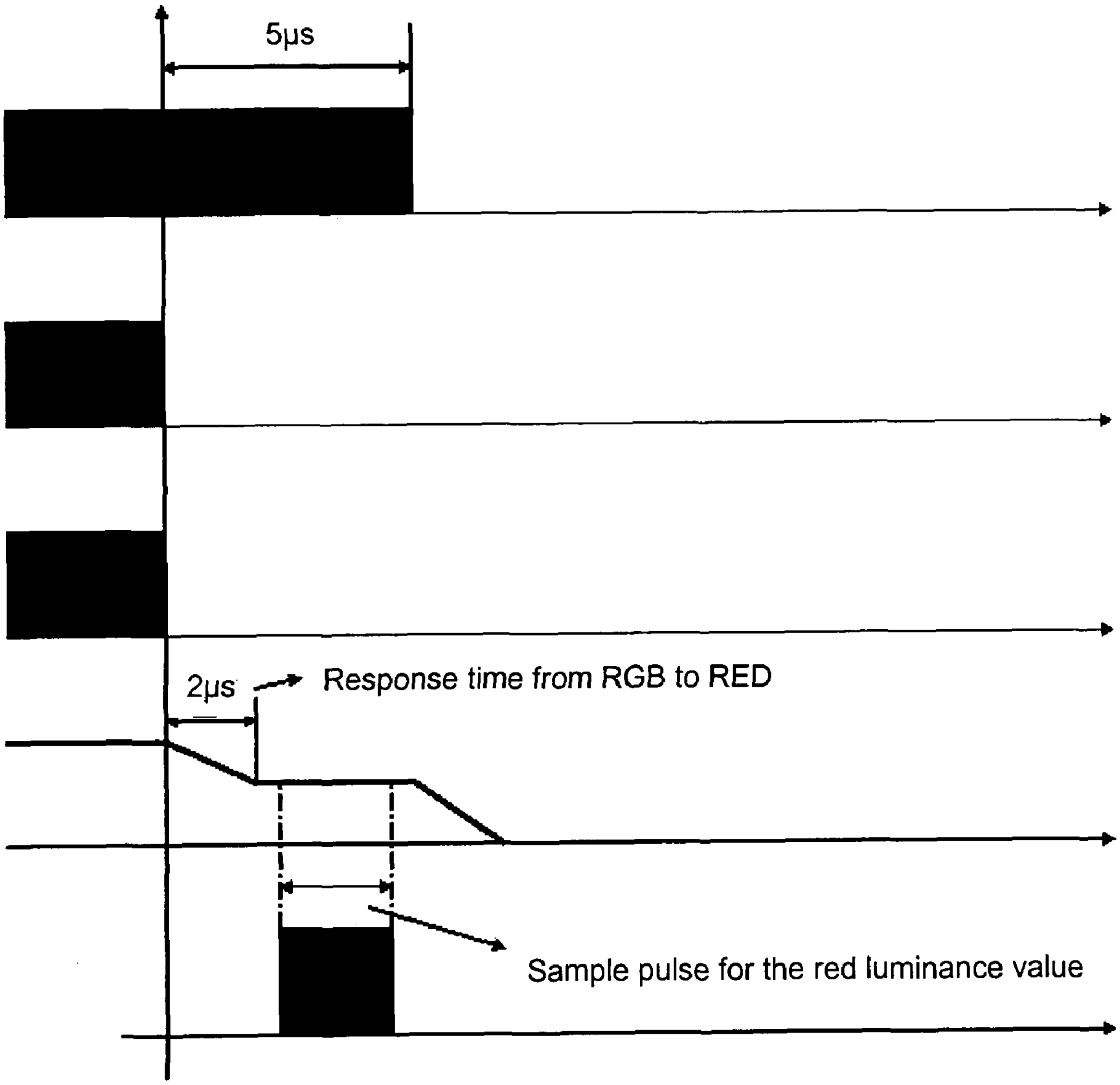
FIG. 5 shows the shift and sampling in accordance with embodiments of the present invention in more detail.

A flow chart 30 of an embodiment of the method of the present invention is illustrated in the right hand side of FIG. 3. First, in step 31, first drive settings for each of the plurality of coloured light sources are determined so as to provide illumination light with a pre-determined colour point and/or a pre-determined luminance. In accordance with the present invention, if the duty cycle is high enough (check made in step 32), i.e. if the pulse width of the shortest colour pulse is larger than the addition of the response time of the sensor and the sample time, i.e. at low dimming and thus at high brightness, the system selects a first colour to measure the luminance, e.g. RED. In order to be able to measure the RED, the driving of the RED is shifted in time from the GREEN and the BLUE, step 33, so that the RED light source (or the light sources of the red colour channel) is (are) energised or driven at a moment in time when the other, e.g. GREEN and BLUE, light sources are not driven. The first light source is thus driven separately from the other light sources, as illustrated in FIG. 4, or in more detail in FIG. 5. Because the peak value of the luminance is measured, this shift time can be very short (response time of the sensor). In the example given in FIG. 5, the shift time has a length of 5 μs. After the value is stable (depending on the response time of the optical sensor, in the example given about 2 μs), a sample and hold circuit 68 samples the peak value of the luminance, step 34, and saves the luminance value in a memory 69, step 35. This sample and hold action requires about 2 to 3 μs. The moment the luminance value is sampled, there is no interference from the other colours, so a clear luminance value for the particular colour can be obtained, without interference from the other colours present in the backlight.

Thereafter, in the embodiment illustrated, an analogous operation is performed in sequence for the other light sources, e.g. the GREEN and the BLUE light sources. The system selects a second colour to measure the luminance, e.g. GREEN. In order to be able to measure the GREEN, the driving of the GREEN is shifted in time from the RED and the BLUE, step 36, so that the GREEN light source (or the light sources of the green colour channel) is (are) energised or driven at a moment in time when the other, e.g. RED and BLUE, light sources are not driven. The second light source is thus driven separately from the other light sources, as illustrated in FIG. 4. After the value is stable, a sample and hold circuit 68 samples the peak value of the luminance, step 37, and saves the luminance value in a memory 69, step 38.

Thereafter, in the embodiment illustrated, an analogous operation is performed for the light sources of the third colour, in the example given BLUE, as illustrated by method steps 39, 40, 41.

From the measured value stored in a memory 69, the controller 66 calculates the drive settings (current control signal 64 and PWM control signal 65), step 43, to maintain the desired mixed colour point, e.g. white colour point. One of the colours is used as reference to regulate the mixed colour luminance.

According to embodiments of the present invention, a temperature sensor 70 may be provided for sensing the temperature of the light sources, e.g. LEDs 60, 61, 62. Based on the measured temperature, a wavelength shift of the colour LEDs 60, 61, 62 may be tracked by means of look-up tables indicating wavelength shift in function of temperature. The fractions of the colours are then recalculated by using new x,y-coordinates for the colours which have wavelength shifted, and these recalculated fractions are used as input for the luminance compensation. Calculation of such fractions is exemplified below. This is illustrated in method step 42.

This sequence is repeated continuously or quasi-continuously for each colour.

Furthermore, in an alternative and preferred embodiment, as can be appreciated from FIG. 4, the measurement of all colours may be intermixed with a luminance measurement 45 performed at a moment in time when none of the colour channels red, green, blue are energised. This measures the offset value of the optical sensor, i.e. the luminance sensed when a value for black should be obtained, which offset value can be subtracted from the measured luminance values for the colour channels in order to obtain more accurate measurement values.

Because the PWM control signals 65 are generated by the controller 66 and peak luminance values are measured, method steps 34, 37, 40, the luminance can be calculated and regulated to the desired or required colour point, e.g. white point. This system does not require any recalibration or initiated calibration step to regulate the desired colour point, e.g. white point, over lifetime. Also, because only one sensor is used, there is no variation between the colour measurements (same response, same temperature behaviour, no differential ageing, etc.) which is a big advantage for colour stability and robustness of the system over lifetime and temperature range.

As an example, if the pulse width modulation has a frequency of 180 Hz, one pulse width period P as illustrated in FIG. 4 has a duration of 5.5 ms. If an optical sensor is used with a response time of 2 μs, and the sample time is 3 μs, then the shift time over which the driving of a selected colour for measurement purposes needs to be shifted is 5 μs. Therefore, the dimming ratio is about 1100:1. For the same sensor, if a pulse width modulation with a frequency of 90 Hz is used, the dimming ratio is about 2200:1. The shift time is about 0.01% of the PWM period.

Furthermore, for high dimming applications (check made in method step 32 of FIG. 3), embodiments of the present invention provide temperature compensation. If the luminance/duty cycle is very low, high dimming occurs. If the dimming ratio is higher than the response time of the sensor, PWM pulses are too short to be sampled, and the feedback system in accordance with embodiments of the present invention may be provided with switching means switching the control to a temperature control algorithm based on lookup tables and the last luminance measurements, as illustrated in the left hand side of FIG. 3. The system thus automatically switches to temperature compensation based on the latest luminance values measured during high brightness or thus low dimming mode, step 46, and on a measured current temperature of the light source, e.g. LED, step 47. The measured luminance and temperature values are used to calculate the required driver settings to maintain the programmed colour point, step 48. The driver settings are changed accordingly, step 49.

At this moment in time, as the temperature feedback is only used when almost no power is in the LED, the temperature of the LED can easily be determined, step 47, by determining the LED die temperature. Typical power LEDs have a temperature drop ΔT (die–solder point) of 10 K/W but if the duty cycle is >1/2000 the temperature drop ΔT is negligible and the board temperature can be measured to know the LED die temperature. Depending on the used LED, technology dimming ratios of more than 15000:1 are possible.

The present invention also includes a computer program product which provides the functionality of any of the methods according to the present invention when executed on a computing device, e.g. the controller. Further, the present invention includes a data carrier such as a CD-ROM or a diskette which stores the computer product in a machine readable form and which executes at least one of the methods of the invention when executed on a computing device. Nowadays, such software is often offered on the Internet or a company Intranet for download, hence the present invention includes transmitting the computer product according to the present invention over a local or wide area network. The computing device may include one of a microprocessor and an FPGA.

As an example only, the needed fractions $f_R$, $f_G$, $f_B$ of RED, GREEN and BLUE flux respectively, with given RED, GREEN and BLUE xy-coordinates ($x_R$, $y_R$), ($x_G$, $y_G$), ($x_B$, $y_B$), are calculated hereinafter, in order to produce a given 9000K white point, with given xy-coordinates ($x_W$, $y_W$).

In general, the needed fractions of the light sources are expressed in function of the xy-coordinates of the available RED, GREEN and BLUE light sources and in function of the xy-coordinates of the white point as follows:

$$\begin{pmatrix} f_R \\ f_G \\ f_B \end{pmatrix} = \underbrace{\begin{pmatrix} \frac{x_R}{y_R} & \frac{x_G}{y_G} & \frac{x_B}{y_B} \\ 1 & 1 & 1 \\ \frac{1-x_R-y_R}{y_R} & \frac{1-x_G-y_G}{y_G} & \frac{1-x_B-y_B}{y_B} \end{pmatrix}^{-1}}_{Part\ A} \underbrace{\begin{pmatrix} \frac{x_W}{y_W} \\ 1 \\ \frac{1-x_W-y_W}{y_W} \end{pmatrix}}_{Part\ B}$$

The explicit form of the inverse matrix is shown in FIG. 7.

If, for R, G and B LEDs of a light source, with given colour coordinates:

$x_R=0.700$, $y_R=0.299$ $x_G=0.206$, $y_G=0.709$ $x_B=0.161$, $y_B=0.020$ the R, G and B flux fractions needed to produce 9000 K white light with $x_W=0.287$ and $y_W=0.296$ are to be calculated, then substituting the x and y values of RED, GREEN and BLUE LEDs results in the numerical matrix:

$$A = \begin{pmatrix} 2.3411 & 0.2906 & 8.0500 \\ 1.0000 & 1.0000 & 1.0000 \\ 0.0033 & 0.1199 & 40.9500 \end{pmatrix}$$

The inverse of this matrix is:

$$A^{-1} = \begin{pmatrix} 0.4825 & -0.1292 & -0.0917 \\ -0.4838 & 1.1325 & 0.0675 \\ 0.0014 & -0.0033 & 0.0242 \end{pmatrix}$$

Substituting the $x_W$ and $y_W$ coordinates of the white point results in the column vector:

$$B = \begin{pmatrix} 0.9696 \\ 1.0000 \\ 1.4088 \end{pmatrix}$$

Finally, multiplying the inverted matrix by the column vector, results in the flux fractions:

$$\begin{pmatrix} f_R \\ f_G \\ f_B \end{pmatrix} = A \otimes B = \begin{pmatrix} 0.2094 \\ 0.7584 \\ 0.0322 \end{pmatrix}$$

Or stated in words: to produce 1 lm of white light (9000 K) with coordinates ($x_W$, $y_W$)=(0.287, 0.297) with the above-mentioned RED, GREEN and BLUE LEDs, the following fractions are needed:

RED=0.21 lm

GREEN=0.76 lm

BLUE=0.03 lm

It is to be understood that although preferred embodiments, specific constructions and configurations, as well as materials, have been discussed herein for devices according to the present invention, various changes or modifications in form and detail may be made without departing from the scope and spirit of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for controlling an illumination system comprising a plurality of coloured light sources, there being at least one or more light sources of a first colour and one or more light sources of a second colour, the first colour being different from the second colour, the illumination system being for emitting illumination light, the method comprising determining first drive settings for each of the plurality of coloured light sources so as to provide illumination light with a pre-determined colour point and/or a pre-determined luminance, the first drive settings generating an ON time and an OFF time of the light sources;

for each of the light sources of the first colour and the light sources of the second colour performing a measuring step, the measuring step comprising changing the first drive settings so that the ON time of the light sources of a selected one of the first and second colour does not coincide with the ON time of the light sources of the other colours for at least a period of time, and during that period of time, measuring the peak luminance of the light sources of the selected one of the first and second colour; and for each of the light sources of the first colour and the second colour performing a calculation step, comprising based on the measured peak luminance for the light sources of that colour, and recalculating the drive settings into second drive settings so as to maintain pre-determined colour point.

2. The method according to claim 1, comprising performing the calculation step for the light sources of a selected first one of the first and second colour before performing the measurement step of a selected second one of the first and second colour.

3. The method according to claim 1, comprising performing the calculation step of the light sources of the selected first one of the first and second colour and the calculation step of the light sources of the selected second one of the first and second colour after performing the measurement step for both colours.

4. The method according to claim 1, wherein the first drive settings comprise current control and pulse width modulation control.

5. The method according to claim 1, furthermore comprising directly or indirectly measuring temperature of the coloured light sources.

6. A system for controlling an illumination system comprising a plurality of coloured light sources, there being at least one or more light sources of a first colour and one or more light sources of a second colour, the first colour being different from the second colour, the illumination system being for emitting illumination light, the system comprising driving means for driving each of the plurality of coloured light sources so as to provide illumination light with a pre-determined colour point and/or a pre-determined luminance, the driving means generating an ON time and an OFF time of the light sources based on first drive settings, a controller adapted for changing, for the light sources of the first colour, the first drive settings so that the ON time of the light sources of the first colour does not coincide with the ON time of the light sources of the other colours for at least a period of time, measuring means for measuring, during that period of time, the peak luminance of the light sources of the first colour, the controller being adapted for recalculating, based on the measured peak luminance for the light sources of the first colour, the first drive settings into second drive settings so as to maintain pre-determined colour point.

7. The system according to claim 6, wherein the plurality of coloured light sources are light emitting diodes.

8. The system according to claim 6, wherein the plurality of coloured light sources are red, green and blue light sources.

9. The system according to claim 6, the system being incorporated in a display system.

10. A controller for controlling an illumination system comprising a plurality of coloured light sources, there being at least one or more light sources of a first colour and one or more light sources of a second colour, the first colour being different from the second colour, the illumination system being for emitting illumination light, and driving means for driving each of the plurality of coloured light sources so as to provide illumination light with a pre-determined colour point and/or a pre-determined luminance, the driving means generating an ON time and an OFF time of the light sources based on first drive settings, the controller comprising: means for changing, for the light sources of the first colour, the first drive settings so that the ON time of the light sources of the first colour does not coincide with the ON time of the light sources of the other colours for at least a period of time, measuring means for measuring, during that period of time, the peak luminance of the light sources of the first colour, and the controller being adapted for recalculating, based on the measured peak luminance for the light sources of the first colour, the first drive settings into second drive settings so as to maintain pre-determined colour point.

11. The controller according to claim 10, the controller being part of a display system.

12. A computer program product for executing the method of claim 1 when executed on a processing device.

13. A machine readable storage medium storing the computer program product of claim 12.

* * * * *